2,849,507

PREPARATION OF ALL-TRANS-CAROTENOID COMPOUNDS

Otto Isler, Basel, Herbert Lindlar, Reinach, Basel Land, Marc Montavon and Rudolf Rüegg, Basel, and Paul Zeller, Neuallschwil, Switzerland, assignors to Hoffmann-La Roche Inc., Nutley, N. J., a corporation of New Jersey No Drawing. Application December 15, 1955
Serial No. 553,216

Claims priority, application Switzerland
December 24, 1954

4 Claims. (Cl. 260—666)

This invention relates to an improved process for the preparation of all-trans-carotenoid compounds. More particularly, it relates to an improved process for the preparation of an all-trans-$C_{40}$-carotenoid compound by thermal isomerization of a 15,15'-mono-cis-$C_{40}$-carotenoid compound. [In those nomenclatures employed in the instant disclosure wherein $C_{40}$-carotenoid compounds are named by analogy to carotene as a reference structure, the numbers are applied to the forty carbon atoms of the fundamental carotenoid carbon skeleton according to the numbering system shown in Liebigs Annalen der Chemie, volume 573, page 3 (1951), as a model.] The $C_{40}$-carotenoid compounds which can be processed according to the invention are all those which have a cis-configuration in 15,15'-position; including (by way of illustration but not of limitation) compounds having the carbon skeletons characteristic of lycopene and α-, β- and γ-carotene; oxy and oxo derivatives thereof, such as 3,3'-dihydroxy-β-carotene and 4,4'-dioxo-β-carotene; and hydrogenated and dehydrogenated analogs thereof, such as 3,4-dehydro-β-carotene and 7,7'-dihydro-β-carotene.

Briefly described, the invention provides a process for the preparation of an all-trans-$C_{40}$-carotenoid compound which comprises heating a suspension of a 15,15'-mono-cis-$C_{40}$-carotenoid compound in an inert organic liquid.

An important aspect of the invention subserves the obtainment, by a process of total synthesis, of all-trans-$C_{40}$-carotenoid compounds having the same chemical structure as naturally occurring $C_{40}$-carotenoids, which are chiefly hydrocarbons and oxy and oxo derivatives thereof. In attainment of this objective, the invention provides a process for the preparation of an all-trans-$C_{40}$-carotenoid compound which comprises heating a member selected from the group consisting of 15,15'-mono-cis-$C_{40}$-carotenoid hydrocarbons and oxy and oxo derivatives thereof, said member being in suspension in an inert organic liquid. Starting materials of the latter group are in general obtainable by total synthesis.

The process of this invention can be effected by heating the 15,15'-mono-cis-$C_{40}$-carotenoid starting material, in suspension in an inert organic liquid, at a moderately elevated temperature, preferably between about 70° C. and about 100° C. Suitable inert organic liquids are those which do not react with either the 15,15'-mono-cis-carotenoid starting material or the all-trans-carotenoid end product under the conditions of the reaction. Saturated and unsaturated hydrocarbons, both acyclic and cyclic, such as pentanes, hexanes, cyclohexane, benzene, toluene, petroleum ethers, and the like; aliphatic esters such as ethyl acetate; and similar inert organic liquids; are suitable for the process of the invention. Especially preferred are inert aliphatic hydrocarbon liquids, such as petroleum ethers having a boiling range appropriate to the desired temperature of heating.

Inasmuch as the all-trans-carotenoid end products are more difficultly soluble than the 15,15'-mono-cis-carotenoid starting materials, the process of the invention obviates an equilibrium between the two isomeric forms, i. e. the mono-cis starting material and the all-trans end product. The all-trans carotenoid end product crystallizes continuously as it is formed in the isomerization mixture, and concomitantly the more easily soluble 15,15'-mono-cis-carotenoid starting material goes into solution. Since the major proportion of the carotenoid materials engaged in the process is present in crystalline condition, undesired side reactions are limited to a minimum and the amount of inert organic liquid required is much smaller than would otherwise be the case.

One preferred embodiment of the invention relates to a process for the preparation of totally synthetic all-trans-β-carotene which comprises heating a suspension of 15,15'-mono-cis-β-carotene in an inert organic liquid comprising essentially aliphatic hydrocarbon material; preferably, saturated aliphatic hydrocarbon material. Thus, an advantageous embodiment of the invention comprises heating, at a temperature between about 80° and about 100° C., for a period of from about 8 to about 12 hours, and while stirring, one part by weight of 15,15'-mono-cis-β-carotene in from about one to about five parts by weight of a petroleum fraction, or similar hydrocarbon material, having a boiling range included within the range between about 80° C. and about 120° C. At the end of the reaction period, the all-trans-β-carotene product has crystallized out practically completely, and can be obtained easily and in a high degree of purity by a simple filtration operation.

The 15,15'-mono-cis-$C_{40}$-carotenoid starting materials for the process of the invention can be made, in general, by condensing an appropriate $C_{19}$-aldehyde with each of the reactive hydrogens of acetylene and hydrolyzing to form a $C_{40}$-diol, subjecting the latter to bilateral allyl rearrangement-dehydration to yield a 15,15'-dehydro-$C_{40}$-carotenoid compound, and catalytically hydrogenating the 15,15'-acetylenic linkage in the latter compound to an olefinic linkage, thereby forming the desired 15-15'-mono-cis-$C_{40}$-carotenoid starting material.

The all-trans-$C_{40}$-carotenoid compounds obtained according to the process of the invention are useful, for example, as coloring materials for foodstuffs and animal feeds.

The invention is further disclosed in the following examples, which are illustrative but not limitative thereof.

Example 1

100 g. of 15,15'-mono-cis-β-carotene was suspended in 500 ml. of petroleum ether (boiling range 80°–100° C.). The mixture was heated for 10 hours at 80° C., while stirring, in a carbon dioxide atmosphere. Then the mixture was allowed to stand for a few hours at 0° C., and the material which crystallized out was filtered. There was thus obtained 95–97 g. of all-trans-β-carotene, M. P. 180° C., absorption maxima in the ultraviolet spectrum at 453 mµ ($E_1^1$ 2560) and 480 mµ ($E_1^1$ 2230) in petroleum ether.

By following exactly the same procedure, except substituting ethyl acetate for the petroleum ether as the inert organic liquid employed, 90 g. of all-trans-β-carotene was obtained.

Example 2

A suspension of 5 g. of 15,15'-mono-cis-3,4,3',4'-bisdehydro-β-carotene in 30 ml. of cyclohexane was refluxed for 22 hours in a nitrogen atmosphere. The reaction mixture was then chilled, and the material which crystallized was filtered off and recrystallized from a mixture of methylene chloride and methanol. There was thus obtained 4 g. of all-trans-3,4,3',4'-bisdehydro-β-carotene, M. P. 190°–191° C., absorption maximum in the ultraviolet spectrum at 471 m$\mu$ ($E_1^1$ 2400) in petroleum ether.

Example 3

A suspension of 2 g. of 15,15'-mono-cis-3,4-dehydro-$\beta$-carotene (disclosed in applicants' copending application Serial No. 553,218, filed December 15, 1955) in 10 ml. of petroleum ether (boiling range 80°–100° C.) was refluxed for 20 hours in a nitrogen atmosphere. The mixture was chilled and the crystalline precipitate was filtered off. The crystalline material was then recrystallized from a mixture of methylene chloride and methanol. There was thus obtained an excellent yield of all-trans-3,4-dehydro-$\beta$-carotene, M. P. 186° C., absorption maximum in the ultraviolet spectrum at 461 m$\mu$ ($E_1^1$ 2330) in petroleum ether.

Example 4

A suspension of 1 g. of 15,15'-mono-cis-4,4'-dihydroxy-$\beta$-carotene (disclosed in applicants' copending application Serial No. 553,217, filed December 15, 1955) in 3 ml. of petroleum ether (boiling range 80°–100° C.) was heated at 80° C. for 12 hours in a carbon dioxide atmosphere. The reaction mixture was then chilled and filtered. The crystalline product obtained was recrystallized from a mixture of methylene chloride and methanol, thereby yielding all-trans-4,4'-dihydroxy-$\beta$-carotene, M. P. 145°–147° C. (with decomposition), absorption maxima in the ultraviolet spectrum at 452 m$\mu$ and 480 m$\mu$ in petroleum ether.

Example 5

A suspension of 20 g. of 15,15'-mono-cis-lycopene in 50 ml. of petroleum ether (boiling range 80°–100° C.) was refluxed for 10 minutes in a carbon dioxide atmosphere. The mixture was chilled and the crystalline precipitate was filtered off. The solid material on the filter was recrystallized from a mixture of methylene chloride and methanol. There was thus obtained all-trans-lycopene, M. P. 173° C.

The starting material for this example, 15,15'-mono-cis-lycopene, can be made by the following procedure:

10 g. of 2,7-dimethyl-2,6-octadien-4-yne-1,8-diol was dissolved in 1500 ml. of dry acetone; 150 g. of manganese dioxide (prepared according to J. Chem. Soc., 1952, 1094) was added and the mixture was shaken mechanically for 2 hours. The manganese dioxide was sucked off, washed with acetone until the filtrate ran off nearly colorless, and then the yellow acetone solution was concentrated in vacuo. Approximately 9.7 g. of a solid, yellow residue was obtained, which was recrystallized from ether/petroleum ether. The 2,7-dimethyl-2,6-octadien-4-yne-1,8-dial had M. P. 68° C.; ultraviolet maxima in ethanol at 314 m$\mu$ ($\epsilon$=29000) and 330 m$\mu$ ($\epsilon$=26200).

To a hot solution of 40 g. of 2,7-dimethyl-2,6-octadien-4-yne-1,8-dial in 120 g. of ethyl orthoformate was added a hot solution of 4 g. of ammonium nitrate in 50 ml. of absolute ethanol, and the mixture was allowed to stand for 48 hours, the mixture thus gradually reaching room temperature. Then the reaction mixture was taken up in diethyl ether, washed with dilute aqueous sodium bicarbonate solution and dried over potassium carbonate. After concentration of the ether solution, the excess of ethyl orthoformate as well as ethyl formate produced by reaction was removed from the condensation product in vacuo. By distillation in a high vacuum there was obtained pure 2,7-dimethyl-2,6-octadien-4-yne-1,8-tetraethyldiacetal, B. P. 122° to 127° C. at 0.03 mm.; $n_D^{24°}$ 1.4892; ultraviolet maxima: 273 m$\mu$, $\epsilon$=27,200, and 288 m$\mu$, $\epsilon$=22,600 (in conc. ethanol).

To a mixture of 102 g. of 2,7-dimethyl-2,6-octadien-4-yne-1,8-tetraethyldiacetal and 0.5 ml. of boron trifluoride etherate was gradually added 47 g. of ethyl vinyl ether, while stirring. The rate of addition was so adjusted that the reaction temperature was maintained between 30° and 35° C. The mixture was stirred for a further period of 3 hours at 35° C., and was then taken up in diethyl ether, washed with dilute aqueous sodium hydroxide solution and dried over potassium carbonate. After concentration of the ether solution, 137 g. of crude 3,10-diethoxy-4,9-dimethyl-4,8-dodecadien-6-yne-1,12-tetraethyldiacetal was obtained. The compound, after purification by distillation in a high vacuum, had B. P. 160°–161° C. at 0.03 mm.; $n_D^{29°}$ 1.4778; ultraviolet maxima: 274 m$\mu$, $\epsilon$=26,200, and 290 m$\mu$, $\epsilon$=23,400 (in conc. ethanol).

In order to hydrolyze the above diacetal, the 137 g. of crude 3,10-diethoxy-4,9-dimethyl-4,8-dodecadien-6-yne-1,12-tetraethyldiacetal was dissolved in a mixture of 800 ml. of dioxan, 200 ml. of water and 35 ml. of syrupy phosphoric acid (containing 87% by weight $H_3PO_4$) and a trace of hydroquinone was added thereto. The mixture was boiled for 7 hours under a nitrogen atmosphere, during which period a mixture of dioxan, ethanol and water was slowly distilled off through a column packed with Raschig rings. The reaction volume was maintained constant by dropwise addition of a mixture of dioxan and water. The hot reaction mixture was then poured, with stirring, into 2000 ml. of ice water. Immediately 4,9-dimethyl-2,4,8,10-dodecatetraen-6-yne-1,12-dial precipitated in crystalline form. The precipitate was sucked off and washed well with water. After recrystallization from ethyl alcohol and drying in vacuo, 45 g. of the pure compound, M. P. 165° C., was obtained.

To a warm solution of 30 g. of 4,9-dimethyl-2,4,8,10-dodecatetraen-6-yne-1,12-dial in 100 g. of ethyl orthoformate was added a warm solution of 2 g. of ammonium nitrate in 100 ml. of absolute ethanol, and the mixture was heated until, on dilution, crystals of starting material no longer separated. The reaction mixture was then taken up in diethyl ether, and the solution was washed with dilute aqueous sodium bicarbonate solution and dried over potassium carbonate. After concentration of the ether solution, the excess ethyl orthoformate as well as ethyl formate formed by reaction, were separated from the reaction mixture in vacuo. The residue was distilled in a high vacuum, yielding 4,9-dimethyl-2,4,8,10-dodecatetraen-6-yne-1,12-tetraethyl-diacetal, M. P. 181° C./0.04 mm.; $n_D^{27°}$ 1.57; U. V. maxima: 330 m$\mu$, $\epsilon$=46,400, and 350 m$\mu$, $\epsilon$=48,300 (in ethanol).

To 45 g. of 4,9-dimethyl-2,4,8,10-dodecatetraen-6-yne-1,12-tetraethyl-diacetal and 0.5 g. of boron trifluoride etherate was added gradually, with stirring, 80 g. of ethyl propenyl ether. The rate of addition was so adjusted that the reaction temperature was maintained between 30° and 35° C. Stirring was continued for 3 hours at 35° C. Then the reaction mixture was taken up in diethyl ether, and the solution was washed with dilute aqueous sodium hydroxide solution and dried over potassium carbonate. Concentration of the ethereal solution yielded crude 3,14-diethoxy-2,6,11,15-tetramethyl-4,6,10,12-hexadecatetraen-8-yne-1,16-tetraethyl-diacetal, which had two absorption maxima in the ultraviolet spectrum, at 330 m$\mu$ and 350 m$\mu$ (in ethanol).

In order to effect hydrolysis, the crude 3,14-diethoxy-2,6,11,15-tetramethyl-4,6,10,12-hexadecatetraen-8-yne-1,16-tetraethyl-diacetal was dissolved in a mixture of 300 ml. of dioxan, 60 ml. of water and 10 ml. of syrupy (87%) phosphoric acid, and a small amount of hydroquinone was added. The mixture was boiled under nitrogen for 7 hous; a mixture of dioxan, alcohol and water being thus distilled off from the reaction mixture through a column packed with Raschig rings. The volume of the reaction mixture was maintained constant by dropping a mixture of dioxan and water into the reaction mixture. The hot reaction mixture was then poured into ice water, with stirring, the 2,6,11,15-tetramethyl-2,4,6,10,12,14-hexadecahexaen-8-yne-1,16-dial thus precipitating immediately in crystalline form. The precipitate was filtered with suction and thoroughly washed with water. The pure dialdehyde, having a melting point of 190° to 192° C., was obtained by recrystallization from a mixture of benzene and petroleum ether.

Over a period of one hour, 217 g. of 1-bromo-3,7-dimethyl-2,6-octadiene was added, with stirring, to a solution of 288 g. of triphenyl-phosphine in 500 ml. of benzene, at room temperature. The reaction mixture was stirred for 48 hours after all the bromo reactant had been added. The solid material formed was filtered off, washed with benzene and petroleum ether in turn, then was dried at 40° C. under a water pump vacuum. 100 g. of the triphenyl - (3,7 - dimethyl - 2,6 - octadien - 1 - yl)-phosphonium bromide so obtained (M. P. 171°–173° C.) was suspended in 100 ml. of absolute diethyl ether and reacted with a solution of 16.8 g. of phenyl lithium in 400 ml. of absolute diethyl ether, by heating and stirring. The suspended material lost hydrogen bromide and dissolved to form a deep red solution of triphenyl-(3,7-dimethyl-2,6-octadien-1-ylidene)-phosphine, which was diluted by addition of a further quantity of 700 ml. of absolute diethyl ether and used directly for the procedure described in the next paragraph.

To the deep red solution of triphenyl-(3,7-dimethyl-2,6-octadien-1-ylidene)-phosphine in 1200 ml. of absolute diethyl ether, obtained as described above, was added dropwise over a period of 5 minutes, with stirring and in a nitrogen atmosphere, a solution of 20 g. of 2,6,11,15-tetramethyl - 2,4,6,10,12,14 - hexadecahexaen - 8 - yne-1,16-dial in 500 ml. of methylene chloride. After completion of addition, the reaction mixture was stirred for a further period of 15 minutes at 30° C., and was then refluxed for 5 hours. At the end of this time, 600 ml. of methanol was added to the warm reaction mixture and the latter was stirred and cooled to 10° C. The crystal slurry was filtered in a carbon dioxide atmosphere, washed with 200 ml. of methanol, and dried at 50° C. in a high vacuum. The product, 15, 15'-dehydro-lycopene, was obtained as crystals having the form of red leaflets, in a yield of 34.5 g.; M. P. 166°–168° C., U. V. maxima at 452 m$\mu$ and 484 m$\mu$, $E_1^1$ 2420 and 2010 (in petroleum ether).

The above obtained 34.5 g. of 15,15'-dehydro-lycopene was suspended in 350 ml. of petroleum ether (boiling range 80°–100° C.) and to the solution was added 12 g. of a palladium-on-calcium carbonate catalyst partially inactivated with lead [Lindlar, Helvetica Chimica Acta, 35, 450 (1952)] and 6 ml. of quinoline. The reaction mixture was shaken in a hydrogen atmosphere (slight superatmospheric gauge hydrogen pressure) at room temperature until the uptake of hydrogen ceased. The mixture was filtered, the solid residue was shaken well with 1200 ml. of methylene chloride, and the resulting suspension was filtered. The methylene chloride solution obtained as filtrate was concentrated at 20° C. in a water pump vacuum, and the residue was shaken for 30 minutes in a carbon dioxide atmosphere with 1000 ml. of petroleum ether (boiling range 30°–70° C.). The petroleum ether extract was filtered and the filtrate was taken to dryness in vacuo, yielding 15,15'-mono-cis-lycopene, having a characteristic "cis peak" in the ultraviolet absorption spectrum at 362 m$\mu$ (in petroleum ether).

We claim:

1. A process for the preparation of an all-trans-carotenoid compound which comprises heating a mixture of a 15,15'-mono-cis-$C_{40}$-carotenoid compound and an inert hydrocarbon liquid, wherein initially at least a major proportion of the said mono-cis-carotenoid compound is in suspension in said hydrocarbon liquid.

2. A process for the preparation of an all-trans-$C_{40}$-carotenoid compound which comprises heating a mixture of member selected from the group consisting of 15,15'-mono-cis-$C_{40}$-carotenoid hydrocarbons and oxy and oxo derivatives thereof and an inert hydrocarbon liquid, wherein initially at least a major proportion of the said mono-cis-carotenoid compound is in suspension in said hydrocarbon liquid.

3. A process for the preparation of all-trans-$\beta$-carotene which comprises heating a mixture of 15,15'-mono-cis-$\beta$-carotene and an inert organic liquid comprising essentially aliphatic hydrocarbon material, wherein initially at least a major proportion of the said mono-cis-carotene is in suspension in said liquid.

4. A process for the preparation of all-trans-$\beta$-carotene which comprises heating at about 80° C. a mixture of 15,15'-mono-cis-$\beta$-carotene and a petroleum ether boiling within a range of from about 80° C. to about 100° C., wherein initially at least a major portion of the said 15,15'-mono-cis-$\beta$-carotene is in suspension in said petroleum ether.

References Cited in the file of this patent

UNITED STATES PATENTS 2,671,112    Inhoffen et al. _____ Mar. 2, 1954